4 Sheets--Sheet 1.

B. EDGAR.

Washing-Machines

No. 135,211. Patented Jan. 28, 1873.

Witnesses:

Inventor:

4 Sheets--Sheet 2.
B. EDGAR.
Washing-Machines
No. 135,211.  Patented Jan. 28, 1873.
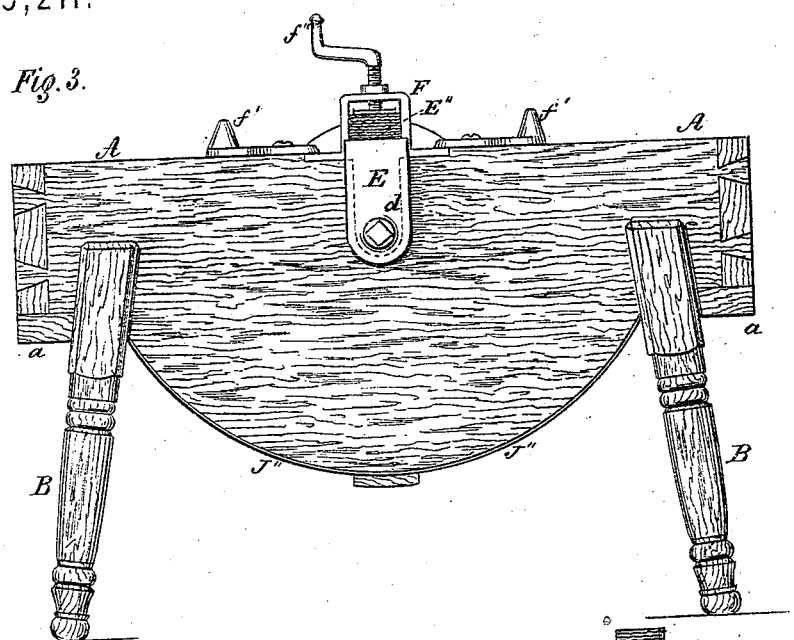
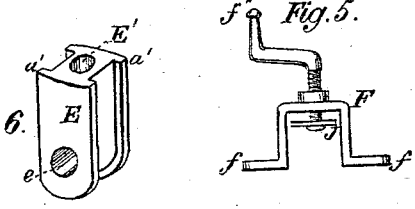
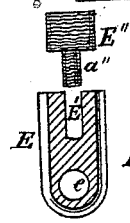
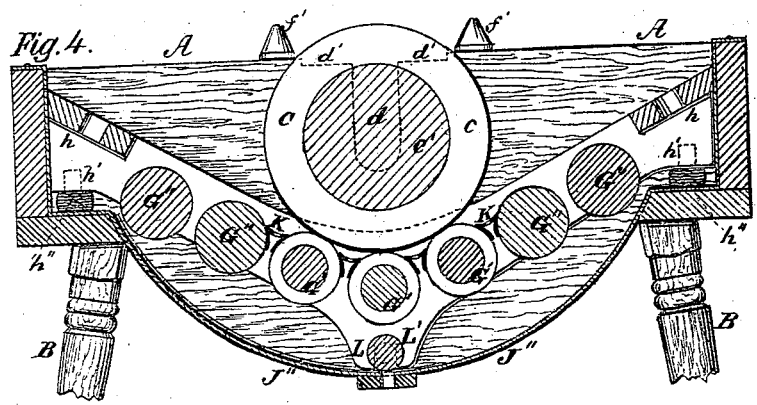

4 Sheets--Sheet 3.

B. EDGAR.
Washing-Machines.

No. 135,211.  Patented Jan. 28, 1873.

Witnesses:  Inventor:

4 Sheets--Sheet 4.

B. EDGAR.
Washing-Machines.

No. 135,211. Patented Jan. 28, 1873.

Witnesses:

Inventor:

UNITED STATES PATENT OFFICE.

BUTLER EDGAR, OF ESPY, PENNSYLVANIA.

IMPROVEMENT IN WASHING-MACHINES.

Specification forming part of Letters Patent No. 135,211, dated January 28, 1873.

*To all whom it may concern:*

Be it known that I, BUTLER EDGAR, of Espy, Columbia county, State of Pennsylvania, have invented certain new and useful Improvements in Washing-Machines, of which the following is a specification:

This my present application is an improvement upon Letters Patent issued to the undersigned August 27, 1872, No. 130,848, to which reference is respectfully made.

The object of my invention is so to construct a machine that its action shall, under all circumstances, be vertical, uniform, and self-adjusting; that whether the clothes or articles to be operated upon be run through in large or small quantities, of even or uneven surface, whether through the center or side of the machine, they shall be thoroughly cleansed; and so to construct a machine that, with the exception of the exterior frame or box, it shall be so put together, and its various parts so maintained in position, as not to be liable to get out of repair, yet can be taken apart, cleaned, and adjusted without drawing nails or screws; and having India-rubber and wooden rollers alternated with metal perforated or solid slats or bars, rubber springs, metal concave frames or ribs, metal or wooden saddle-bar, and metal sliding boxes, so combined as to produce the foregoing results, which will be more fully shown by the accompanying drawing.

Figure 1:
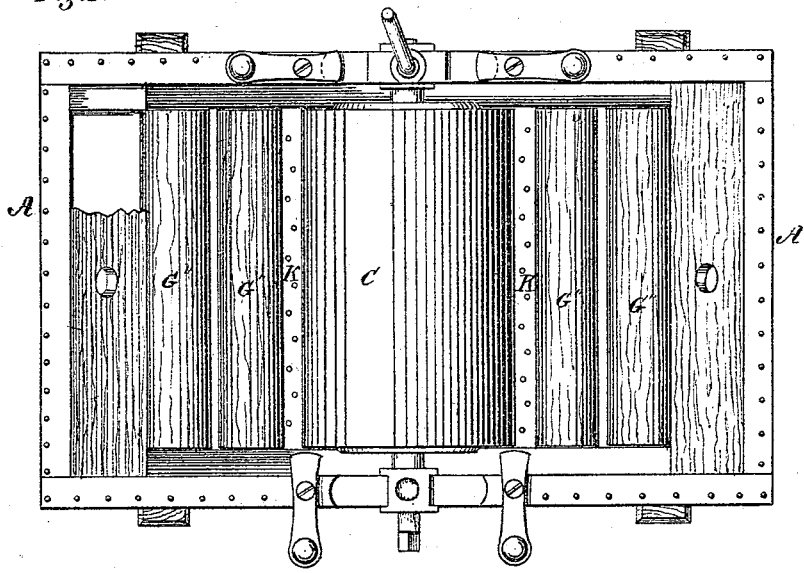
Figure 2:
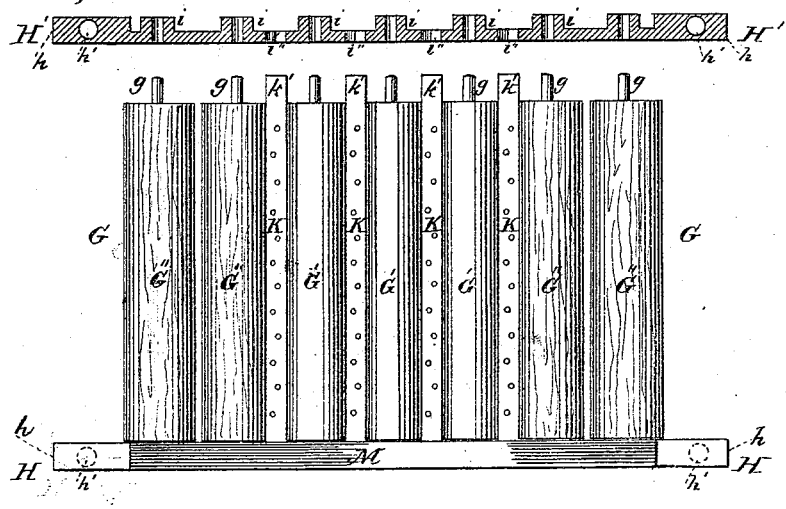
Figure 10:
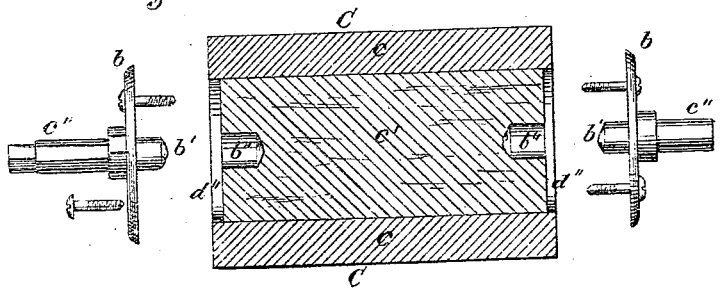
Figure 11:
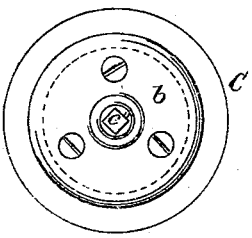
Figure 12:
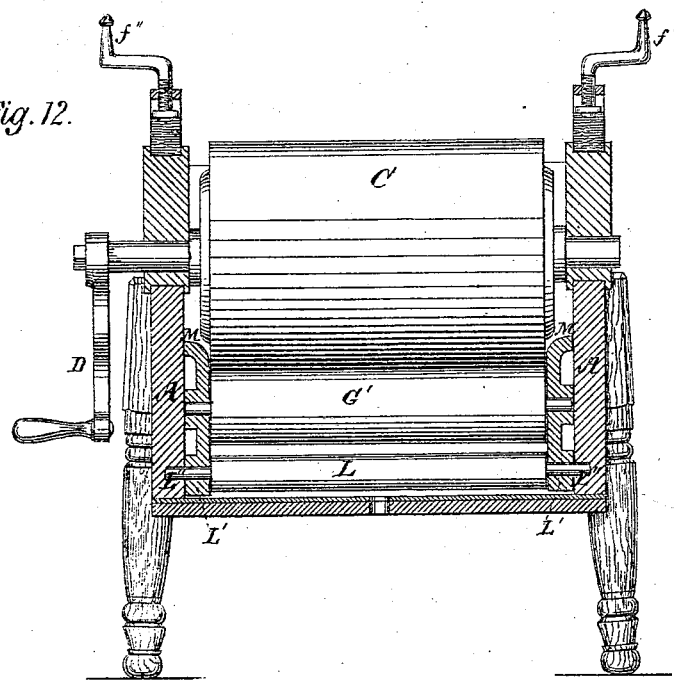
Figure 13:
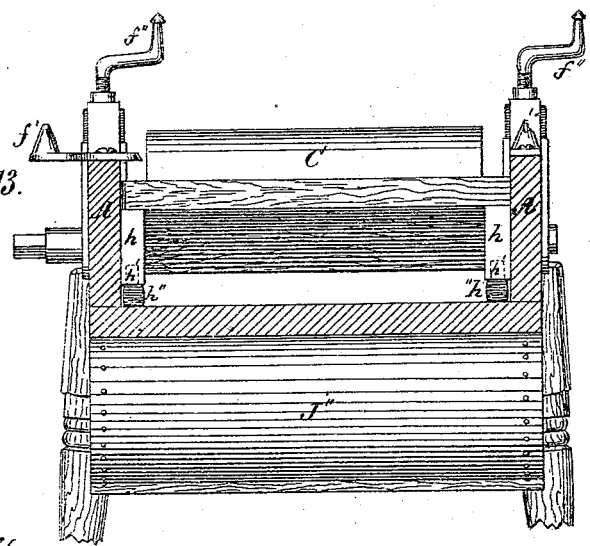

Figure 1 is a top view of a machine embodying my invention. Fig. 2 is a floor or system of rollers, alternated with metal perforated slats, with the frames or ribs detached, in which they work. Fig. 3 is a side view of the machine. Fig. 4 is a central longitudinal section of a machine in working order, showing the positions of the large and small India-rubber and wooden rollers, the metal slats, the saddle-bar, the shape of the frames or ribs, and cushions or springs on which they rest. Figs. 5, 6, 7, 8, 9, 10, and 11 are details of Fig. 4. Fig. 12 is a cross-section of a machine in working order, showing the large roller in contact with the small rollers, and crank by which the former is revolved. Fig. 13 is an end view, showing the ends or terminuses of the frames or ribs and cushions or springs on which they rest.

*General Description.*

Figure 9:
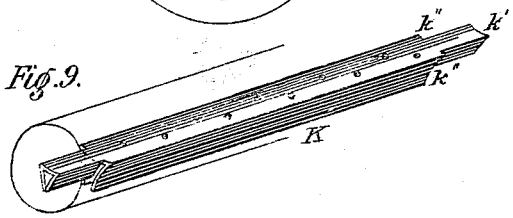
Figure 8:
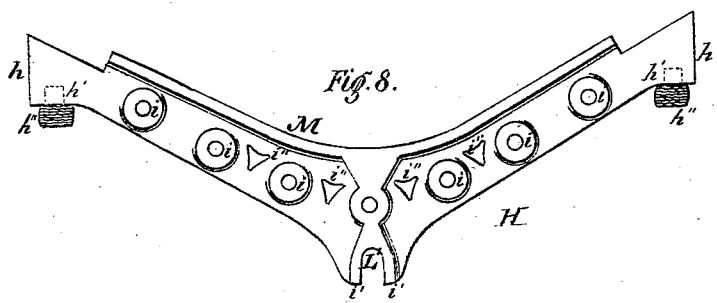

A A, Fig. 3, is the exterior frame of the machine, constructed of cheap, sound boards, dovetailed at the ends, the upper surface straight, about three feet long, about eighteen inches wide; the lower surface concave in the direction of its length, with shoulders $a$ $a$ about six inches long in the same direction. The depth of the frame at the center or greatest depression of the concave is about one foot. The inner and outer concaves are lined with some cheap metal. B B are common wooden legs, about two and a half feet long, on which the machine rests, placed under the shoulders $a$ $a$ and fastened to the frame or box A A at either corner, as seen in Fig. 3. C, Fig. 12, is the main roller, of straight surface, about seven inches in diameter, and, with the exception of a wooden center-piece or frame hereafter described, is made of India rubber, a transverse section of which, C C, is shown in Fig. 4, and a longitudinal section, C C, in Fig. 10. The center of this roller is solid wood, or a wooden frame, $C'$ $C'$, Figs. 4 and 10, to either end of which are fastened gudgeons $C''$ $C''$ by means of the flanges $b$ $b$, Fig. 10. The gudgeons $C''$ $C''$ are elongated on the inside of the flanges $b$ $b$, and fitted into the sockets $b''$ $b''$ in the wooden center-piece $C'$ $C'$, one-half or three-fourths of an inch deep, in order to preserve an exact central, as well as firm, motion, to the main roller C, (see Fig. 10,) and, in case of strong pressure, to prevent or resist the tendency to loose the fastenings of the gudgeons, whereby a wabbling unsteady motion would be given to the main roller C, thereby materially impairing, if not quite destroying, its utility, and, consequently that of the machine. The gudgeons $C''$ $C''$, flanges $b$ $b$, and elongations $b'$ $b''$ being of one piece, may be manufactured of any cheap metal. The length of the wooden center-piece or frame $C'$ is somewhat shorter ($d''$, Fig. 10) than the surrounding rubber C C, so that the rubber is horizontally compressed when the flanges $b$ $b$ are firmly fastened to the ends of the center-piece $C'$ $C'$, whereby the full elastic power of the rubber is obtained. Said center-piece may be fluted or octagonal-shaped to prevent the outer coating of rubber from sliding when the machine is worked. E E, Figs. 3, 6, and 7 are two sliding metal boxes, about six inches long, two inches thick, and four inches wide, set into the center of either side of the frame A A perpendicularly and directly over the lowest depression of the concave, closely fitted to the edges of the frame where they are introduced, the frame being cut away to receive them. (d, Figs. 3 and 4.) These boxes are grooved or slotted, a' a', Fig. 6, on either side equal to the thickness of the edge of the frame A A with square shoulders, so that they slide freely and steadily up and down; at the same time hold the sides of the frame from warping as it is wrought upon by external influences. Transversely through the lower end of said boxes E E, in the supports e e, Figs. 6 and 7, work the gudgeons C'' C''. Perpendicularly in the upper end of the boxes E E are sunk the small sockets E' E', Fig. 6, and a sectional view, Fig. 7, to receive the tenons a'' a'' of the rubber springs E'' E'', shown in Fig. 7. The springs E'' E'' are of the same size as the upper end of the boxes E E on which they rest, and about one and one-half inches high. F F, Fig. 5, are two movable metal staples or stirrups, about two and a half inches high, in width corresponding to the thickness of the edge of the frame A A on which they stand, and into which they are sunk by the notches d' d', Fig. 4, being placed centrally over the boxes E E, and inclosing on two sides the rubber springs E'' E'', Fig. 3. The upper ends of these stirrups are solid and square, the lower ends open, with foot-pieces or shoulders f f, Fig. 5, let into the edges of the frame A A, as above described, and fastened in their places by the metal buttons f' f', Fig. 3. Centrally through the top of the stirrups pass common thumb-screws f'' f'', Fig. 5, which control the action of the rubber springs E'' E'' by the nut J J, Fig. 5. G G, Fig. 2, of which a longitudinal section is shown in Fig. 4. G' G' G'' G'' is a floor or system of rollers, more or less in number, according to the size of the machine to be constructed, about two inches in diameter, working on spindles or gudgeons g g, firmly driven into or affixed to either end. These rollers are constructed, some wholly of wood, others of wood and India rubber combined. G' G', Figs. 2 and 4, forming the center of the floor, are constructed, substantially as the main roller C, of India rubber, wooden center-piece, straight surfaces, with gudgeons, flanges, &c., as set forth in the description of said roller C, Fig. 10. The small rollers G'' G'', made of wood, are placed in equal numbers on either side of the small rubber rollers G' G', and are of the same diameter. The rubber rollers G' G' are located immediately beneath, in contact with and operated upon by the main roller C. H and H' are two concave metal frames or ribs, of which a sectional view is seen in Fig. 2, H' being detached, and inside and outside side views seen in Figs. 4 and 8, respectively. The body of these frames or ribs does not set flush up to the sides of the machine, but touches them only at certain points, as will appear below. They receive the spindles or gudgeons g g of the small rollers G' G'', the ends k' k' of the metal slats K K, and sustain the floor or system of rollers G G as a whole. Conforming to the floor of the machine J'' J'', Fig. 4, they terminate in either corner with the shoulders h h, on the under side of which are sockets h' h', which receive the upper end of the rubber springs or cushions h'' h'', and at the lowest point of the concave connect with the saddle-bar by notch L'. (See Figs. 4 and 8.) These frames or ribs rest on the rubber cushions h'' h'', are their only support, as they are their only point of contact with the floor of the machine. M M are the upper edges of the ribs, shown in Figs. 2 and 8. They rise above the upper surfaces of the small rollers from two to three inches, and, turning outward flush with the sides of the machine, form flanges from end to end of said ribs, and effectually prevent the articles to be washed from becoming entangled on the ends or gudgeons of the rollers, giving great firmness to the ribs when the machine is worked. The bosses i i, Fig. 2, and flange i', Fig. 8, serve the same purpose. K K, Figs. 1, 2, and 9, are hollow metal slats, about one and one-half inches wide, perforated to facilitate the circulation of the water, held in position in like manner with the small rollers, with which they are alternated, made of cheap metal, of flat, smooth surfaces, slightly ovaled along their edges in the direction of their length, tenoned at their ends k' k', which pass through the ribs, (shown at i'' i'', Fig. 8,) with square shoulders k'' k'' closely fitting the insides of the frames or ribs, thereby holding them firmly in their places. These slats are set as near the small rollers as practicable, in order to prevent any tendency the clothes may have to run between or of being wrapped around the rollers, to form, with the rollers, as near as the nature of the case will permit, a perforated or open elastic floor. The sides of the slats are bent and extended downward equal to the diameter of the small rollers, and made sufficiently concave to adapt them to the convexity of the rollers. L, Fig. 12, is a saddle-bar, passing transversely through the center of the machine, very near the bottom, and firmly fastened at either end L'' L'' into the sides of the machine. This bar is connected with the frames or ribs at the notch L', Figs. 4 and 8, but not in a fixed manner, (they are notched on only,) and is designed to prevent the strain and derangement of the floor of rollers consequent upon the backward and forward, or oscillating motion of the machine. The water is drawn out of the machine by a common faucet inserted in the bottom.

When the water is drawn off the machine becomes a clothes-wringer, as complete in all its appointments and action, and for similar reasons, as it is a washing-machine.

I claim—

1. The slats K K, the saddle-bar L, and the frames or ribs H and H', as constructed and for the purpose specified.

2. The main roller C, the small rollers G' G", as constructed, acting upon each other, as specified, in combination with the slats K K with the saddle-bar L, the concave frames or ribs H H', the metal sliding boxes E E, the rubber springs E" E", the metal staples or stirrups F F, the thumb-screws $f'$ $f'$, and rubber cushions or springs $h''$ $h''$, embodying the construction of a machine, whose action shall be uniform and vertical, however the power may be applied, as and for the purpose specified.

BUTLER EDGAR.

Witnesses:
 A. McDOWELL,
 H. T. AMES.